(12) United States Patent
Vetteth

(10) Patent No.: US 8,996,900 B2
(45) Date of Patent: Mar. 31, 2015

(54) SYSTEM AND METHOD FOR MANAGING POWER CONSUMPTION IN DATA PROPAGATION ENVIRONMENTS

(75) Inventor: Anoop Vetteth, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 371 days.

(21) Appl. No.: 12/700,175

(22) Filed: Feb. 4, 2010

(65) Prior Publication Data
US 2011/0191608 A1    Aug. 4, 2011

(51) Int. Cl.
*G06F 1/32*      (2006.01)
*G06F 15/16*     (2006.01)

(52) U.S. Cl.
CPC    *G06F 1/32* (2013.01); *G06F 15/16* (2013.01); *Y02B 60/43* (2013.01)
USPC ............ 713/323; 713/310; 713/320; 713/324

(58) Field of Classification Search
CPC ....... G06F 1/32; G06F 1/3203; G06F 1/3206; G06F 1/3234; G06F 1/3278; G06F 1/3287; H04L 12/12; H04L 12/40039; Y02B 60/30; Y02B 60/32; Y02B 60/34; Y02B 60/35
See application file for complete search history.

(56) References Cited

U.S. PATENT DOCUMENTS

| | | | |
|---|---|---|---|
| 4,785,927 A | 11/1988 | Dobbins | |
| 6,269,343 B1 | 7/2001 | Pallakoff | |
| 6,415,270 B1 | 7/2002 | Rackson et al. | |
| 6,618,709 B1 | 9/2003 | Sneeringer | |
| 6,681,156 B1 | 1/2004 | Weiss | |
| 6,686,709 B2 | 2/2004 | Lee et al. | |
| 6,785,592 B1 | 8/2004 | Smith et al. | |
| 6,930,947 B2 | 8/2005 | Chen | |
| 6,980,526 B2 | 12/2005 | Jang et al. | |
| 7,084,752 B2 | 8/2006 | Parello et al. | |
| 7,177,728 B2 | 2/2007 | Gardner | |
| 7,188,260 B1 | 3/2007 | Shaffer et al. | |

(Continued)

FOREIGN PATENT DOCUMENTS

WO    WO2013/025267    2/2013

OTHER PUBLICATIONS

Wertheimer et al., Capabilities Negotiation Proposal for Energy-Efficient Ethernet, May 2008, IEEE 802.3az, pp. 1-18.*

(Continued)

*Primary Examiner* — Dennis M Butler
(74) *Attorney, Agent, or Firm* — Patent Capital Group

(57) ABSTRACT

An example method includes communicating a first signal to a remote computer element, the first signal can be used to establish a link between the remote computer element and a local computer element. The method also includes evaluating whether the remote computer element is configured to support a low-power protocol in which low-power IDLE signals are exchanged between the local computer element and the remote computer element, the evaluating occurs using a link layer protocol. In detailed embodiments, the method includes negotiating a wake-up time for the remote computer element to shift from a low-power mode to an active mode. The method can also include evaluating buffer parameters to confirm the wake-up time for the remote computer element to shift to the active mode. In still other embodiments, the method can include delaying a data transmission on the link for at least the wake-up time that was negotiated.

19 Claims, 5 Drawing Sheets

(56) References Cited

U.S. PATENT DOCUMENTS

| | | | |
|---|---|---|---|
| 7,203,849 B2 | 4/2007 | Dove | |
| 7,263,450 B2 | 8/2007 | Hunter | |
| 7,324,518 B2 | 1/2008 | Dai et al. | |
| 7,337,336 B2 | 2/2008 | Ferentz et al. | |
| 7,366,933 B1 | 4/2008 | Aharonian et al. | |
| 7,392,407 B2 | 6/2008 | Jonnala et al. | |
| 7,698,580 B2 | 4/2010 | Schindler et al. | |
| 7,734,572 B2 | 6/2010 | Wiemeyer et al. | |
| 7,908,501 B2 | 3/2011 | Kim et al. | |
| 7,921,306 B2 | 4/2011 | Dove | |
| 7,941,677 B2 | 5/2011 | Penning | |
| 7,966,502 B2 | 6/2011 | Diab et al. | |
| 7,974,298 B2 | 7/2011 | Baird et al. | |
| 8,160,753 B2 | 4/2012 | Ferentz et al. | |
| 8,225,124 B2 | 7/2012 | Geiger et al. | |
| 8,250,381 B2 | 8/2012 | Hansalia et al. | |
| 8,261,104 B2 | 9/2012 | Landry et al. | |
| 8,301,918 B2 | 10/2012 | Diab et al. | |
| 8,352,754 B2 | 1/2013 | Chin | |
| 8,407,332 B1 | 3/2013 | Kralpak et al. | |
| 2002/0016639 A1 | 2/2002 | Smith et al. | |
| 2002/0040475 A1 | 4/2002 | Yap et al. | |
| 2002/0157030 A1* | 10/2002 | Barker et al. | 713/320 |
| 2003/0120959 A1 | 6/2003 | Bohrer | |
| 2004/0148388 A1 | 7/2004 | Chung et al. | |
| 2005/0055589 A1 | 3/2005 | Kojo | |
| 2005/0123109 A1 | 6/2005 | Yamagishi et al. | |
| 2005/0243861 A1 | 11/2005 | Elkayam et al. | |
| 2006/0053324 A1 | 3/2006 | Giat et al. | |
| 2006/0056397 A1 | 3/2006 | Aizu et al. | |
| 2006/0072531 A1 | 4/2006 | Ewing et al. | |
| 2007/0014268 A1 | 1/2007 | Kim et al. | |
| 2007/0024239 A1 | 2/2007 | Park | |
| 2007/0043477 A1 | 2/2007 | Ehlers et al. | |
| 2007/0050818 A1 | 3/2007 | Berger et al. | |
| 2007/0135086 A1 | 6/2007 | Stanford | |
| 2007/0143637 A1 | 6/2007 | Tsai | |
| 2007/0189257 A1 | 8/2007 | Suzuki et al. | |
| 2007/0214473 A1 | 9/2007 | Barton et al. | |
| 2007/0276547 A1 | 11/2007 | Miller | |
| 2008/0001584 A1 | 1/2008 | Chen | |
| 2008/0037999 A1 | 2/2008 | Masuda | |
| 2008/0063381 A1 | 3/2008 | Conroy et al. | |
| 2008/0168283 A1 | 7/2008 | Penning | |
| 2008/0178232 A1 | 7/2008 | Velusamy | |
| 2008/0215899 A1 | 9/2008 | Jonnala et al. | |
| 2008/0215902 A1 | 9/2008 | Jonnala et al. | |
| 2008/0225841 A1* | 9/2008 | Conway et al. | 370/389 |
| 2008/0244282 A1 | 10/2008 | Hansalia et al. | |
| 2008/0256371 A1 | 10/2008 | Diab et al. | |
| 2008/0272741 A1 | 11/2008 | Kanamori | |
| 2008/0301322 A1 | 12/2008 | Horibe | |
| 2008/0303486 A1 | 12/2008 | Kao | |
| 2009/0049315 A1 | 2/2009 | Diab et al. | |
| 2009/0070603 A1 | 3/2009 | Diab et al. | |
| 2009/0083167 A1 | 3/2009 | Subbloie | |
| 2009/0182834 A1 | 7/2009 | Zettler et al. | |
| 2009/0195349 A1 | 8/2009 | Frader-Thompson | |
| 2009/0196281 A1 | 8/2009 | Kouchri | |
| 2009/0217063 A1 | 8/2009 | Tomita | |
| 2009/0217188 A1 | 8/2009 | Alexander et al. | |
| 2009/0228723 A1 | 9/2009 | Yoshizaki | |
| 2009/0249091 A1 | 10/2009 | Goodnow | |
| 2009/0263127 A1 | 10/2009 | Haran et al. | |
| 2009/0282277 A1* | 11/2009 | Sedarat et al. | 713/320 |
| 2009/0310607 A1 | 12/2009 | Evans | |
| 2010/0052421 A1 | 3/2010 | Schindler et al. | |
| 2010/0070217 A1 | 3/2010 | Shimada et al. | |
| 2010/0080111 A1* | 4/2010 | Diab et al. | 370/201 |
| 2010/0111523 A1 | 5/2010 | Hirth et al. | |
| 2010/0145542 A1 | 6/2010 | Chapel et al. | |
| 2010/0162294 A1 | 6/2010 | Yin et al. | |
| 2010/0162305 A1 | 6/2010 | Downey et al. | |
| 2010/0172628 A1 | 7/2010 | Berger et al. | |
| 2010/0205466 A1 | 8/2010 | Diab et al. | |
| 2010/0235868 A1 | 9/2010 | Howarter et al. | |
| 2010/0241880 A1* | 9/2010 | Wertheimer et al. | 713/310 |
| 2010/0247068 A1 | 9/2010 | Howarter et al. | |
| 2010/0309904 A1 | 12/2010 | Couse | |
| 2010/0322078 A1* | 12/2010 | Wang et al. | 370/241 |
| 2010/0329108 A1* | 12/2010 | Diab et al. | 370/216 |
| 2011/0022699 A1* | 1/2011 | Powell et al. | 709/224 |
| 2011/0029796 A1* | 2/2011 | Matthews et al. | 713/323 |
| 2011/0067048 A1 | 3/2011 | Barton et al. | |
| 2011/0072286 A1 | 3/2011 | Graham | |
| 2011/0125337 A1 | 5/2011 | Zavadsky | |
| 2011/0131428 A1 | 6/2011 | Diab et al. | |
| 2011/0131438 A1 | 6/2011 | Levitan | |
| 2011/0157939 A1 | 6/2011 | Wang | |
| 2011/0199046 A1 | 8/2011 | Tsai | |
| 2011/0239019 A1 | 9/2011 | Johnston | |
| 2011/0246797 A1 | 10/2011 | Diab et al. | |
| 2012/0045210 A1 | 2/2012 | Kim et al. | |
| 2012/0095610 A1 | 4/2012 | Chapel et al. | |
| 2012/0120958 A1 | 5/2012 | Mahadevan et al. | |
| 2012/0226918 A1 | 9/2012 | Rallo | |
| 2012/0259474 A1 | 10/2012 | Razum et al. | |
| 2012/0284537 A1 | 11/2012 | Kruglick | |
| 2013/0303202 A1 | 11/2013 | Jafarian et al. | |

OTHER PUBLICATIONS

"Data Link Layer", Jun. 28, 2014, Wikipedia, pp. 1-7, http://en.wikipedia.org/wiki/Data link layer.*

"Link Layer Discovery Protocol", Mar. 28, 2014, Wikipedia, pp. 1-4, http://en.wikipedia.org/wiki/Link_Layer_Discovery_Protocol.*

"Cisco Energywise"; Cisco Systems; Feb. 1, 2009; archived from http://www.archive.org; pp. 1-6.

U.S. Appl. No. 12/826,416, filed Jun. 29, 2010, entitled "System and Method for Providing Intelligent Power Management in a Network Environment," Inventors: Ram Mohan R., et al.

U.S. Appl. No. 13/211,798, filed Aug. 17, 2011, entitled "System and Method for Notifying and for Controlling Power Demand," Inventors: Benoit Claise, et al.

USPTO Jun. 23, 2011 Nonfinal Office Action from U.S. Appl. No. 12/368,124.

USPTO Jun. 28, 2011 Nonfinal Office Action from U.S. Appl. No. 12/368,154.

USPTO Sep. 23, 2011 Response to Jun. 23, 2011 Nonfinal Office Action filed in U.S. Appl. No. 12/368,124.

Bruce Nordman, "Energy Efficient Ethernet: Outstanding Questions," Mar. 12, 2007; 3 pages http://grouper.ieee.org/groups/802/3/eee_study/public/mar07/nordman2_01_0307.pdf.

Onn Haran, "Applicability of EEE to Fiber PHYs," IEEE 8.02.3 EEE Meeting; Sep. 2007, Seoul, Korea http://www.ieee802.org/3/eee_study/public/sep07/haran_1_0907.pdf; 12 pages.

Mike Bennett, "IEEE 802.3az Energy Efficient Ethernet," Task Force Update, Presented to the P802.3ba Task Force, Denver, CO; Jul. 16, 2008; 17 pages http://www.ieee802.org/3/az/public/jul08/bennett_03_0708.pdf.

Aviad Wertheimer and Eric Mann, "Active/Idle Toggling with Low-Power Idle," IEEE 802.3az Jan. 2008 Interim Meeting; 15 pages Active/Idle Toggling with Low-Power Idle.

Bruce Nordman, et al., "Energy Efficiency and Regulation," IEEE 802 Tutorial;Jul. 13, 2009; 58 pages.

Smart Board™, "Interactive Whiteboard," Sep. 2005; 2 pages.

U.S. Appl. No. 12/368,124, filed Feb. 9, 2009, entitled "System and Method for Intelligent Energy Management in a Network Environment," Inventor(s): Tirthankar Ghose et al.

U.S. Appl. No. 12/368,154, filed Feb. 9, 2009, entitled "System and Method for Querying for Energy Data in a Network Environment," Inventor(s): Tirthankar Ghose et al.

USPTO Feb. 7, 2012 RCE Response to Final Office Action mailed Nov. 10, 2011 from U.S. Appl. No. 12/368,124.

USPTO Feb. 16, 2012 RCE Response to Final Office Action mailed Nov. 18, 2011 from U.S. Appl. No. 12/368,154.

Battery University, "How to Prolong Lithium-based Batteries," © 2011 Isidor Buchmann, 15 pages http://www.batteryuniversity.com/parttwo-34.htm.

(56) References Cited

OTHER PUBLICATIONS

Claise, Benoit, et al., "Energy Management (eman): Description of Working Group," retrieved and printed on Aug. 17, 2011, 3 pages http://datatracker.ietf.org/wg/eman/charter/.
"IEEE Standard for Information technology—Telecommunications and information exchange between systems—Local and metropolitan area networks—Specific requirements Part 3: Carrier Sense Multiple Access with Collision Detection (CSMA/CD) Access Method and Physical Layer Specifications Amendment: Data Terminal Equipment (DTE) Power via Media Dependent Interface (MDI)," ©2003 IEEE, Jun. 18, 2003, 121 pages.
USPTO Oct. 11, 2011—Response to Jun. 28, 2011 Nonfinal Office Action from U.S. Appl. No. 12/368,154.
USPTO Nov. 10, 2011 Final Office Action from U.S. Appl. No. 12/368,124.
U.S. Appl. No. 13/302,544, filed Nov. 22, 2011, entitled "System and Method for Network Enabled Wake for Networks," Inventors: Charles B. Schoening, et al.
U.S. Appl. No. 13/226,326, filed Sep. 6, 2011, entitled "Power Conservation in a Distributed Digital Video Recorder/Content Delivery Network System," Inventor: William VerSteeg.
USPTO Nov. 18, 2011—Final Office Action from U.S. Appl. No. 12/368,154.
"Wake on Local Area Network (LAN)," EnergyStar Products, Energy Star; [printed on Nov. 16, 2011]; 4 pages; http://www.energystar.gov/index.cfm?c=power_mgt.pr_power_mgt_wol.
USPTO Mar. 28, 2012 Notice of Allowance from U.S. Appl. No. 12/368,154.
U.S. Appl. No. 13/492,617, filed Jun. 8, 2012, entitled "System and Method for Detecting a Power Source and Metering Points of a Network Device in a Network Environment," Inventor: John D. Parello, et al.
USPTO Jun. 20, 2012 Non-Final Office Action from U.S. Appl. No. 12/826,416.
USPTO Jun. 22, 2012 Request for Continued Examination from U.S. Appl. No. 12/368,154.
USPTO Jul. 17, 2012 Second Notice of Allowance from U.S. Appl. No. 12/368,154.
PCT Sep. 5, 2012 International Search Report and Written Opinion from International Application Serial No. PCT/US12/37359 10 pages.
USPTO Aug. 22, 2012 Non-Final Office Action from U.S. Appl. No. 12/368,124.
USPTO Nov. 21, 2012 Response to Aug. 22, 2012 Non-Final Office Action from U.S. Appl. No. 12/368,124.
USPTO Jan. 16, 2013 Final Office Action from U.S. Appl. No. 12/368,124.
USPTO Oct. 12, 2012 Request for Continued Examination from U.S. Appl. No. 12/368,154.
USPTO Oct. 23, 2012 Third Notice of Allowance from U.S. Appl. No. 12/368,154.
USPTO Sep. 19, 2012 Response to Jun. 20, 2012 Non-Final Office Action from U.S. Appl. No. 12/826,416.
USPTO Oct. 25, 2012 Final Office Action from U.S. Appl. No. 12/826,416.
USPTO Jan. 24, 2013 RCE Response to Oct. 25, 2012 Final Office Action from U.S. Appl. No. 12/826,416.
U.S. Appl. No. 13/736,035, filed Jan. 7, 2013, entitled "System and Method for Querying for Energy Data in a Network Environment," Inventor: Tirthankar Ghose, et al.
USPTO Jan. 8, 2014 Notice of Allowance from U.S. Appl. No. 12/368,124.
USPTO Jan. 27, 2014 Notice of Allowance from U.S. Appl. No. 13/736,035.
USPTO Feb. 10, 2014 Non-Final Office Action from U.S. Appl. No. 12/826,416.
USPTO Feb. 6, 2014 Non-Final Office Action from U.S. Appl. No. 13/302,544.
USPTO Jan. 21, 2014 Non-Final Office Action from U.S. Appl. No. 13/226,326.
USPTO Apr. 16, 2013 RCE Response to Final Office Action dated Jan. 16, 2013 from U.S. Appl. No. 12/368,124.
USPTO Mar. 20, 2013 Non-final Office Action from U.S. Appl. No. 12/826,416.
Jetzt et al., "LLDP/LLDP-MED Proposal for PoE Plus,"; PoE Plus Task Force, Sep. 15, 2006, Knoxville, TN; 15 pages.
USPTO Aug. 2, 2013 Response to May 3, 2013 Non-Final Office Action from U.S. Appl. No. 12/368,124.
USPTO Sep. 11, 2013 Final Office Action from U.S. Appl. No. 12/368,124.
USPTO Sep. 18, 2013 Non-Final Office Action from U.S. Appl. No. 13/736,035.
USPTO Aug. 9, 2013 Final Office Action from U.S. Appl. No. 12/826,416.
USPTO Oct. 8, 2013 Response to Jul. 5, 2013 Non-Final Office Action from U.S. Appl. No. 13/302,544.
USPTO Oct. 25, 2013 Final Office Action from U.S. Appl. No. 13/302,544.
USPTO Nov. 11, 2013 RCE Response to Aug. 9, 2013 Final Office Action from U.S. Appl. No. 12/826,416.
USPTO May 3, 2013 Non-Final Office Action from U.S. Appl. No. 13/368,124.
USPTO Jun. 14, 2013 Response to Mar. 20, 2013 Non-final Office Action from U.S. Appl. No. 12/826,416.
USPTO Jul. 5, 2013 Non-Final Office Action from U.S. Appl. No. 13/302,544.
PCT Feb. 18, 2014 International Preliminary Report on Patentability from International Application Serial No. PCT/US12/37359 7 pages.
USPTO May 22, 2014 Non-Final Office Action from Appl. No. 13/302,544.
USPTO Jun. 2, 2014 Notice of Allowance from U.S. Appl. No. 13/211,798.
USPTO Aug. 6, 2014 Final Office Action from U.S. Appl. No. 13/226,326.
USPTO Aug. 28, 2014 Final Office Action from U.S. Appl. No. 13/302,544.
USPTO Sep. 9, 2014 Final Office Action from U.S. Appl. No. 12/826,416.
USPTO Nov. 10, 2014 Non-Final Office Action from U.S. Appl. No. 13/492,617.

* cited by examiner

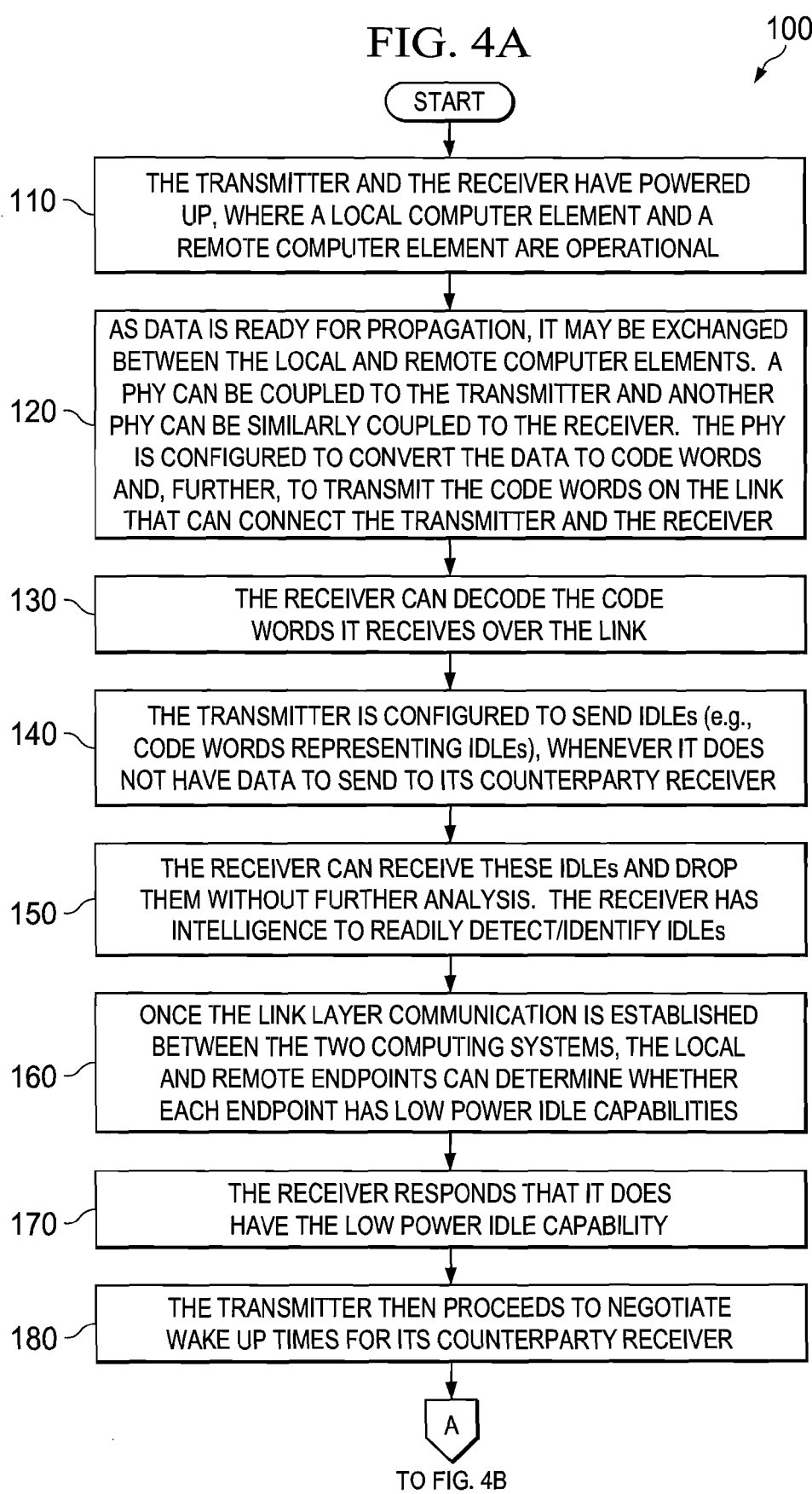

SYSTEM AND METHOD FOR MANAGING POWER CONSUMPTION IN DATA PROPAGATION ENVIRONMENTS

TECHNICAL FIELD

This disclosure relates in general to the field of communications and, more particularly, to managing power consumption in data propagation environments.

BACKGROUND

Consumers and legislators have begun demanding improvements in energy efficiency. Internet protocols were designed when there were relatively few devices connected to the Internet. Currently, millions of devices are connected to the Internet via Ethernet links, where the proliferation of these devices is expected to grow in orders of magnitude. Power states have evolved to the point where they are commonly implemented within most devices (e.g., a low-power sleep state supported by personal computing systems). Energy efficient Ethernet (EEE) features have been developed in order to reduce unnecessary energy consumption. Additionally, many power consumption features may ultimately be required of network components, switches, personal end-user devices, and other electronic components. In some instances, EEE capabilities can enable system-level energy management techniques that save energy. As a general proposition, consuming minimal power, without sacrificing optimal performance, presents a significant challenge to Ethernet equipment vendors, network operators, and system designers alike.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIGS. 4A-B are simplified flow diagrams illustrating potential operations associated with the system for managing power consumption.

DETAILED DESCRIPTION OF EXAMPLE EMBODIMENTS

Overview

A method is provided in one example and includes communicating a first signal to a remote computer element, the first signal can be used to establish a link between the remote computer element and a local computer element. The method also includes evaluating whether the remote computer element is configured to support a low-power protocol in which low-power IDLE signals are exchanged between the local computer element and the remote computer element, the evaluating occurs using a link layer protocol. In more detailed embodiments, the method includes negotiating a wake-up time for the remote computer element to shift from a low-power mode to an active mode. The method can also include evaluating buffer parameters in order to confirm the wake-up time for the remote computer element to shift to the active mode. In still other embodiments, the method can include delaying a data transmission on the link for at least the wake-up time that was negotiated. The link layer protocol can be a link layer discovery protocol (LLDP). The low-power IDLE signals represent code words for the remote computer element to shift into a low-power mode.

EXAMPLE EMBODIMENTS

Figure 1:
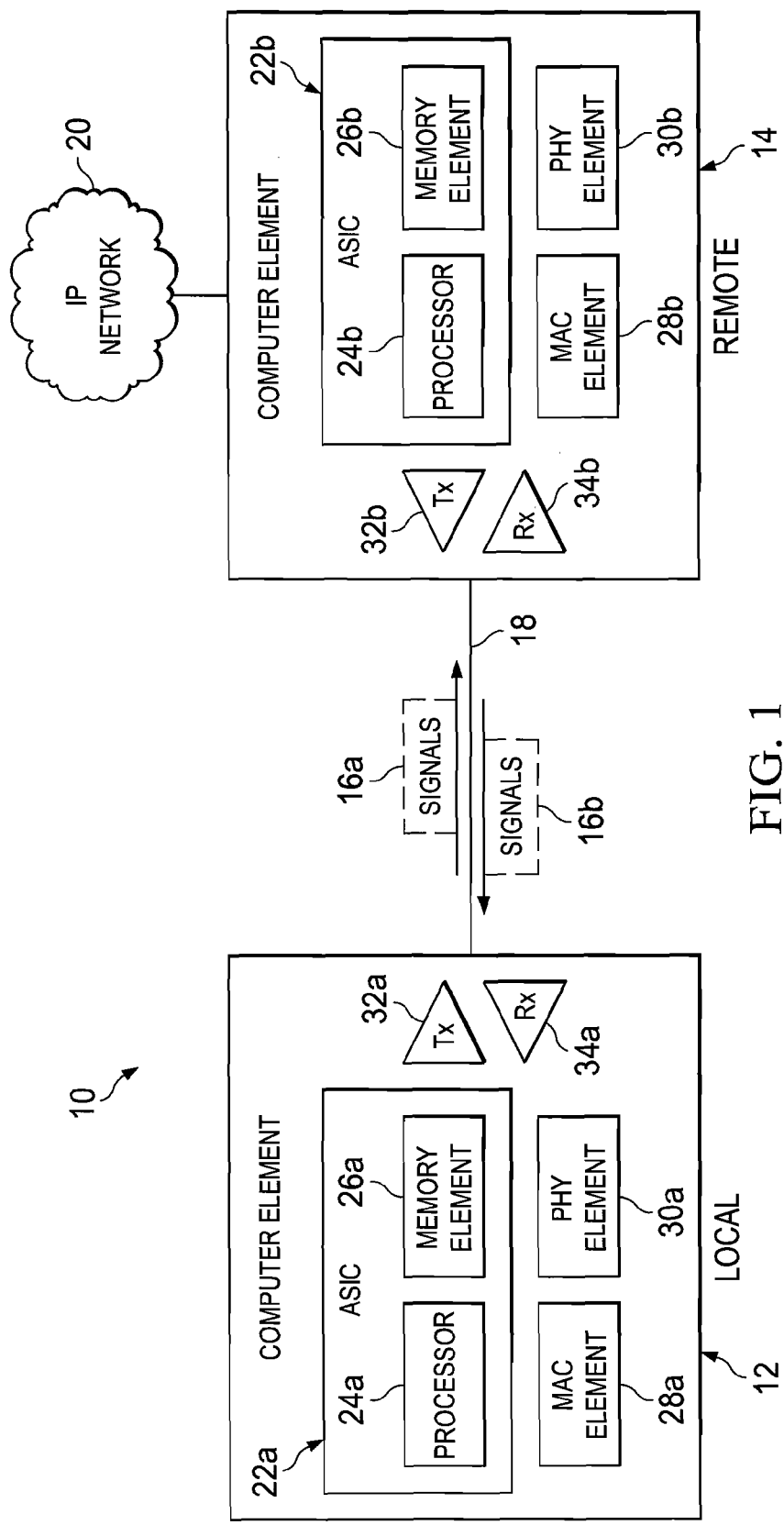
FIG. 1 is a simplified block diagram of an example system for managing power consumption in accordance with one embodiment of the present disclosure.

Turning to FIG. 1, FIG. 1 is a simplified block diagram of an example system 10 for managing power consumption in environments in which data propagates. System 10 includes a computer element 12 and a computer element 14, which is coupled to an Internet protocol (IP) network 20. A link 18 connects computer elements 12 and 14, where these computer elements 12, 14 represent local and remote endpoints, as is illustrated. Each computer element 12, 14 includes a respective application specific integrated circuit (ASIC) 22*a-b*, which further includes a respective processor 24*a-b* and a respective memory element 26*a-b*. Additionally, each computer element 12, 14 includes a respective media access control (MAC) element 28*a-b*, a physical (PHY) element 30*a-b*, a transmitter 32*a-b* (denoted as Tx), and a receiver 34*a-b* (denoted as Rx). Note that the transmitter and receiver could readily be combined into a single element in certain implementations. A plurality of signals 16*a-b* can propagate between computer elements 12 and 14 over link 18.

For purposes of illustrating certain example techniques of system 10, it is important to understand the communications that may be traversing link 18 during data propagation scenarios. The following foundational information may be viewed as a basis from which the present disclosure may be properly explained. Computer elements 12, 14 (as depicted in FIG. 1) can be used to foster data propagation in a multitude of environments. Computer elements of all types can benefit from low-power consumption that reduces energy costs and lowers overall operating costs. Commonly, the majority of computer elements are relatively IDLE most of the time. Such computer elements may include end-user devices such as desktop computers, laptop computers, set-top boxes, and network equipment (switches, routers, gateways, bridges, load balancers, firewalls, servers, etc.). Billions of dollars of electricity are spent keeping these devices fully powered, even when no user is present, when no data is being exchanged, and/or even when network access is sporadic or incidental.

Certain protocols for energy savings are provided at the PHY level when, for example, a network link is IDLE. Additionally, some protocols attempt to provide a mechanism for reducing power consumption during periods of low-link utilization for various physical devices (i.e., PHYs). These PHYs are ubiquitous and, for example, can include receiving and transmitting devices such as the 100 Base-Tx, the 1000 Base-T, the 10 GBase-T, the 10 GBase-KR, the 10 GBase-KX4, etc. Transitions between active/inactive states should be coordinated for a lower level of power consumption for the PHYs. A given PHY is configured to advertise its energy efficient Ethernet (EEE) capability during auto-negotiation. Thus, after the link has been established between remote and local devices, the local PHY typically notifies the system if the remote link partner supports EEE. EEE (also referred to as IEEE 802.3az) represents a mechanism to facilitate a transition to (and from) low-power consumption in response to changes in data propagation demands. The EEE mechanism can be applied to copper PHYs such as those found in the transmitting devices listed above. The EEE mechanism can employ low-power IDLE (LPI) activity (i.e., sending IDLE signals between computer elements 12, 14). Power savings can be achieved in EEE by not transmitting anything during periods of inactivity (e.g., as shown by a QUIET period in FIG. 3). In regards to network infrastructure, computer elements 12, 14 can take advantage of power savings when the network stack experiences periods of inactivity: starting with both sides of the media access control (MAC)/PHY interface when a port is in the EEE mode. In multi-port systems, the savings could be increased further by optimizing shared resources.

Returning to FIG. 1, both computer elements 12, 14 have the ability to negotiate their own capabilities and, further, relay these capabilities to their respective upper layers. Particular to EEE, PHY elements 30a-b are typically delegated the task of negotiation. This negotiation is the mechanism by which a PHY understands if its link partner is capable of supporting the EEE protocol. If both PHY elements 30a-b support EEE, then they can exchange timing parameters (e.g., such as those defined by the EEE protocol).

In accordance with example teachings of the present disclosure, system 10 is configured to allow device negotiations to take place at the data link layer (i.e., Layer-2). The data link layer is configured to provide the functional and procedural mechanism to optimally transfer data between computer elements 12, 14. The data link layer may also provide the mechanism to detect (and possibly correct) errors that may occur in the physical layer.

Additionally, system 10 provides a mechanism (e.g., within ASICs 22a-b) to shift upper layers of associated devices to a low-power mode: much in the same way as the lower layers are shifted to a low-power mode. As an extension to existing signaling, when the upper layers instruct the lower layers to go to a low-power mode, they can also be configured to put their own logic to sleep. When both computer elements 12, 14 are independently capable of handling the low-power modes (e.g., their ASICs are capable of supporting this mode), then as each computer element 12, 14 wakes up from their low-power mode, computer elements 12, 14 can wait a configured time for their peer to also awaken before transmitting data.

Figure 3:
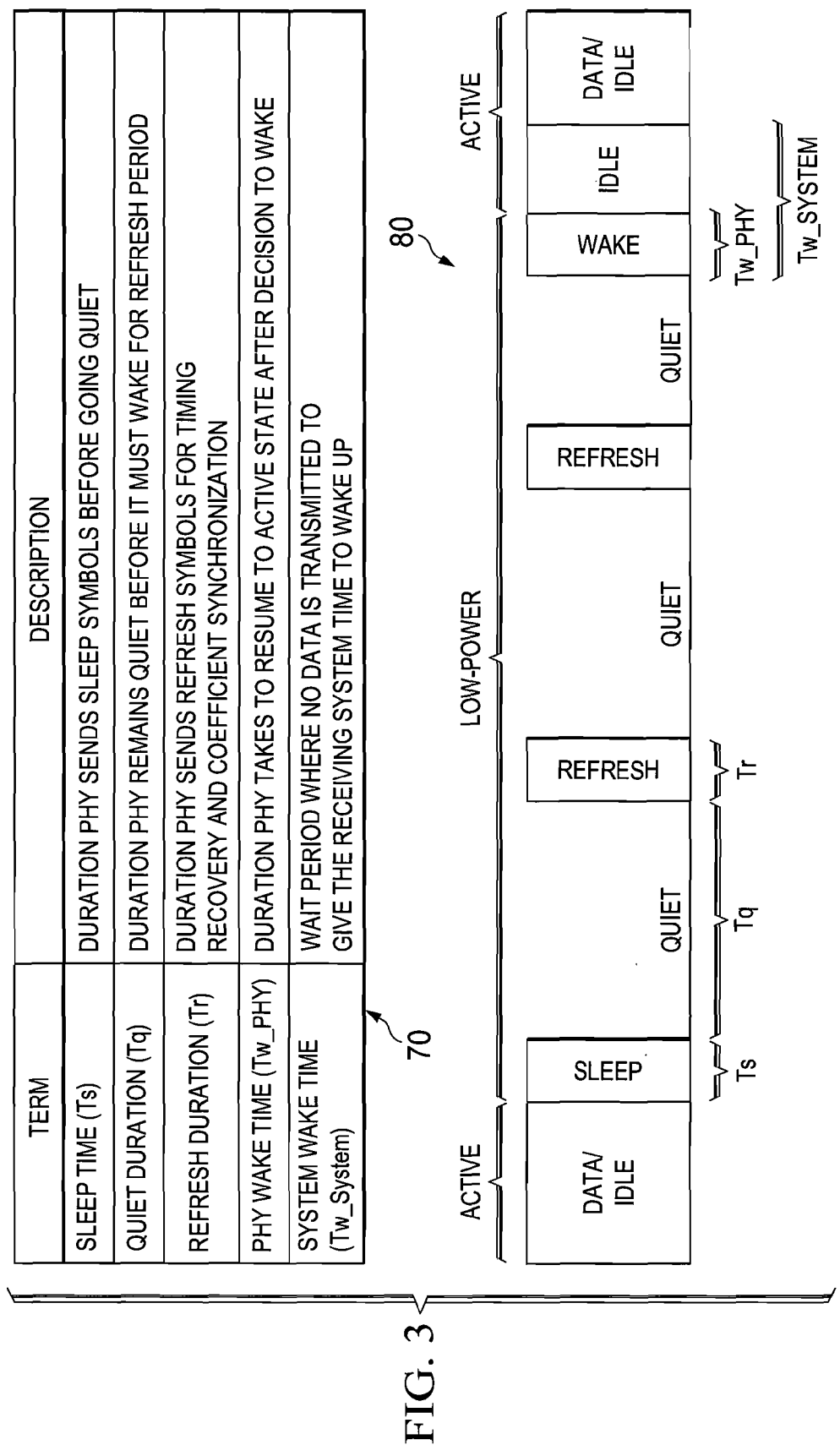
FIG. 3 is a simplified table illustrating time intervals for an example low-power IDLE scenario.

Moreover, system 10 can also offer an optional link layer discovery protocol (LLDP) to negotiate system wake-up times. A given computer element's wake-up time can be designated as greater than or equal to PHY wake-up times. Computer elements 12, 14 can have the ability to request the link partner to hold off from sending data for a longer duration when transitioning from a low-power state to a normal operating state. This, in turn, provides a system with the capability of optionally shifting its receive logic to a low-power mode when the remote MAC is transmitting low-power IDLEs (LPIs) (e.g., in the form of code words/signals 16a-b). The PHY element is configured to then convert the code words into the protocol, as shown in FIG. 3. The negotiated system wake-up time can be sufficiently long to wake-up the receive logic before beginning normal data reception. EEE power savings can be extended further upstream into associated computer elements 12, 14. Typically, the longer the wake-up time for a device, the longer the delay until signals/code words can be exchanged (i.e., latency increases, as there is a trade-off between energy savings and latency).

In a general sense, system 10 offers a PHY agnostic mechanism to reduce power consumption for any number of computing devices. From an operational perspective, system 10 is configured to use of any data link layer protocol (e.g., a discovery protocol, LLDP, etc.) to negotiate EEE capabilities over its link (e.g., a fiber-optic link). Such a protocol could ensure that both ends enable the EEE mode in a way that neither end enters a low-power mode prior to its remote partner being able to accommodate this mode. Other flawed architectures include protocols specific to copper PHYs and backplane PHYs. In contrast, system 10 is applicable to all types of computer elements, including fiber-optic PHYs.

In a typical scenario, MAC elements 28a-b, the physical coding sublayer (PCS), the physical medium attachment (PMA) sublayer, and the physical medium dependent (PMD) sublayer on both ends of link 18 (e.g., a fiber optic link) are active. When there is no data to transmit between computer elements 12, 14, local MAC element 28a is configured to send low-power IDLE signals (i.e., LPIs) in the place of regular IDLEs. This provides an indication to the link partner that it can shift its receive logic to a sleep mode (i.e., into a low-power mode to conserve power). When local computer element 12 seeks to start transmitting data, it stops sending LPIs and sends normal IDLEs for a time equal to the negotiated wake-up time. This gives sufficient time for a link partner to wake-up its receive logic before receiving the incoming data.

System 10 is also forward-looking, as it can readily be configured to use the EEE modes expected to be present on next generation system ASICs to achieve a power savings (e.g., over a fiber-optic link). The PHY driving the link, and the MAC that communicates to the link, are generally kept active. The power savings can be derived from shifting components (e.g., upstream of the MAC elements) to a low-power (e.g., sleep) mode. To be able to achieve this, both link partners understand if they are both capable of accommodating the EEE mode. This knowledge can be ascertained over a link layer protocol, for example, at Layer-2. The protocol employed by computer elements 12, 14 ensures that signals are not dropped by enabling the receiver on the remote link partner to be able to receive LPIs prior to enabling the LPI mode on local transmitter 32a. The protocol also enables systems to negotiate wake-up times that are sufficient to shift receiver 34b from a low-power state to a normal state without dropping signals.

It should also be further noted that, as serializer and deserializer circuit (SERDES) and optics technology matures, the power consumption by the SERDES and the optical module can be reduced using the mechanisms of system 10. For example, the power consumed by a small form-factor pluggable (SFP+) module is about 1 watt. More power is consumed by the core logic on system ASICs because of new features and, further, due to buffering requirements. System 10 can provide a mechanism to reuse the modes that may be present on next generation ASICs to reduce power consumption over links during periods of inactivity. In one example implementation, the mechanisms of system 10 can be provided as an extension to an existing link layer discovery protocol, as detailed herein. Any number of signaling scenarios is possible and, further, some of these potential scenarios are illustrated in an example set of flows discussed below. Before turning to some of the operations of these scenarios, a brief discussion is provided about some of the possible infrastructure of FIG. 1.

Computer elements 12, 14 are representative of any type of device that can foster, conduct, or be part of data propagation. This is inclusive of personal computers, desktop computers, laptop computers, phones, IP phones, personal digital assistants (PDAs), printers, cellular telephones, iPhones, Google Droids, routers, firewalls, switches, servers, load balancers, gateways, bridges, network appliances, or any other suitable device, object, module, or element that can be part of data propagation (either directly or indirectly). Computer elements 12, 14 may also be any device that seeks to initiate a communication on behalf of another entity or element, such as a program, a database, or any other component, device, element, or object capable of initiating an exchange within system 10. Data, as used herein in this document, refers to any type of numeric, voice, video, media, or script data, or any type of source or object code, or any other suitable information in any appropriate format (code words, signals, frames, etc.) that may be communicated from one point to another. In one example scenario, signals 16a-b are physical layer signals or code words that originate from a MAC element. It should be noted that, as used herein, the term 'signal' is meant to include code words, datagrams, or any other suitable mechanism for exchanging information between computer element 12, 14.

Computer elements 12, 14 may include ASICs 22a-b, which may be configured with software (e.g., an application, logic, etc.) to achieve the power-consumption management operations detailed herein. ASICs 22a-b are integrated circuits that can be customized for a particular use (e.g., to be used in an IP phone, a cell phone, a personal computer, a switch, a router, etc.). Each computer element 12, 14 could also include data processing elements, audio/video (A/V) enabled components, a sound card, a video component, a media player, a graphics card, or any other object that facilitates a data transmission. A local device (e.g., local computer element 12) may attempt to perform auto-negotiation with any suitable link partner (which includes remote computer element 14).

In one example implementation, link 18 is a transmission path between any two interfaces of computer elements 12, 14. Link 18 can be representative of coaxial cable, fibers (inclusive of fiber optic elements), twisted pairs of any kind, copper links, wireline links, wireless links, or any other suitable connection mechanism in which data can propagate. In one particular configuration, link 18 is an Ethernet connection between a local link partner and a remote link partner. The Ethernet connection can be a cable, which may include up to four or more links, each of which may, for example, include an unshielded twisted pair (UTP).

In one example implementation, PHY elements 30a-b may be representative of the physical layer between the medium dependent interface (MDI) and the media independent interface (MII), gigabit media independent interface (GMII), the 10-gigabit media independent interface (XGMII), etc. or any other suitable interface. Each PHY element 30a-b can contain functions that transmit, receive, and/or manage the encoded signals that are impressed on (and recovered from) the physical medium. Each of PHY elements 30a-b may include appropriate logic, circuitry, and/or code that may enable communications between computer elements 12, 14. These communications are inclusive of the transmission and the reception of data between a local link partner and a remote link partner. Furthermore, each of PHY elements 30a-b may support, for example, Ethernet operations, which includes enabling multi-rate communications (e.g., 10 Mbps, 100 Mbps, 1 Gbps, 2.5 Gbps, 4 Gbps, 10 Gbps, 40 Gbps, etc.). Thus, each of PHY elements 30a-b may support standard-based data rates and/or non-standard data rates. Additionally, each of PHY elements 30a-b may support standard Ethernet link lengths, ranges of operation, and/or extended ranges of operation.

Each of PHY elements 30a-b can be configured to utilize a link discovery signaling (LDS) operation that enables a detection of active operations in another link partner. In this regard, the LDS operation may be configured for supporting a standard Ethernet operation and/or an extended-range Ethernet operation. Each of PHY elements 30a-b may also support auto-negotiation for identifying and selecting communication parameters such as speed, duplex mode, etc. Each of PHY elements 30a-b may be configured to handle all the physical layer requirements, which include, but are not limited to, packetization, data transfer, and SERDES, in instances where such an appropriate operation is required. Data signals received by PHY elements 30a-b (e.g., from MAC elements 28a-b respectively) may include data and header information for each of the above functional layers. Furthermore, PHY elements 30a-b may be configured to encode data signals that are to be transmitted over link 18, and/or be configured to decode data signals received via link 18.

MAC elements 28a-b may include appropriate logic, circuitry, and/or code that can enable communications between computer elements 12, 14. MAC elements 28a-b may further be configured to handle data link layer (Layer-2) operability and/or functionality in the local and remote link partners respectively. MAC elements 28a-b may communicate with PHY elements 30a-b via an interface and with a given host (e.g., via a suitable bus controller interface). The interfaces may relate to Ethernet components that include protocol and/or link management control signals. The interfaces may be multi-rate interfaces and/or media independent interfaces. The bus controller interfaces may be associated with peripheral component interconnect (PCI) or PCI-X interfaces.

Each respective transmitter 32a-b may include appropriate logic, circuitry, and/or code that may enable communications between computer elements 12, 14. This may occur via link 18 in one example implementation. Similarly, each receiver 34a-b may comprise suitable logic, circuitry, and/or code that enables the reception of data from a link partner. The transmitter/receiver pair for each computer element 12, 14 may be configured to provide the appropriate communication rate and mode.

IP network 20 represents a series of points or nodes of interconnected communication paths for receiving and transmitting information that propagates through system 10. IP network 20 offers a communicative interface between computer element 14 and any other component, selected network, etc. IP network 20 may be any local area network (LAN), wireless local area network (WLAN), metropolitan area network (MAN), Intranet, Extranet, wide area network (WAN), virtual private network (VPN), or any other appropriate architecture or system that facilitates communications in a network environment. IP network 20 may implement a UDP/IP connection and use a TCP/IP communication language protocol in particular embodiments of the present disclosure. However, IP network 20 may alternatively implement any other suitable communication protocol for transmitting and receiving data packets and/or frames within system 10.

In one example implementation, each of these computer elements 12, 14 are configured to include a respective ASIC 22a-b, a respective processor element 24a-b, and a respective memory element 26a-b. Alternatively, the memory and processor elements may be configured in some other location, or be resident in any other appropriate component for carrying out the activities described herein. In addition, each computer element 12, 14 may include software to achieve (or to foster) the power-consumption management operations, as outlined herein in this Specification. Note that in one example, each of these elements can have an internal structure (e.g., a processor, a memory element, etc.) to facilitate some of the operations described herein. The software may be provided to ASICs 22a-b, which can execute commands in order to achieve some of the operational abilities described herein in this Specification. In other embodiments, these power-consumption management features may be provided externally to these elements or included in some other computer element to achieve this intended functionality. Alternatively, computer elements 12, 14 may include this software (or reciprocating software) that can coordinate with other computer elements in order to achieve the operations, as outlined herein. In still other embodiments, one or several devices may include any suitable algorithms, applications, applets, hardware, software, components, modules, interfaces, or objects that facilitate the operations thereof.

Figure 2:
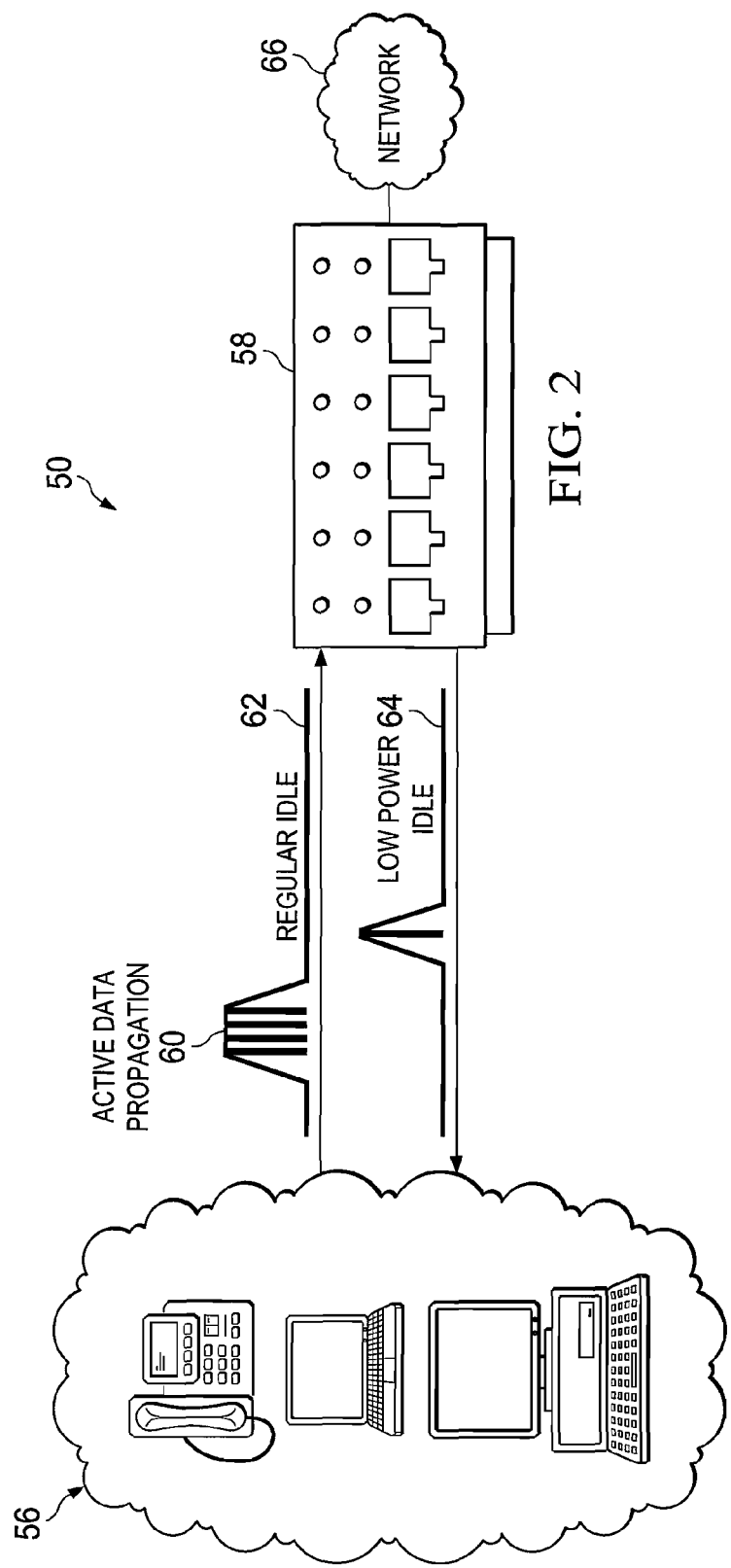
FIG. 2 is a simplified block diagram showing example details associated with one particular embodiment of the system for managing power consumption.

FIG. 2 is a simplified schematic diagram illustrating an example system 50, which is capable of exchanging data between a computer element 56 and an Ethernet switch 58. A network 66 is coupled to Ethernet switch 58. Computer element 56 is similar in structure to computer elements 12, 14 and, hence, can be inclusive of desktop computers, laptops, telephones, PDAs, IP telephones, or virtually any other computing device in which potential power-consumption protocols would be applicable. Conceptually, in a power conscious environment, the objective is to transmit data as quickly as possible and then return to some form of low-power consumption. Energy savings is achieved by cycling between active and low-power states. Power can be reduced by turning off unused circuits during LPI. Typically, the energy use can scale with bandwidth utilization. In this particular example of FIG. 2, active data propagation 60 occurs between computer element 56 and Ethernet switch 58.

In operation, when there is no data to be sent, a plurality of regular IDLE signals 62 are sent. Note that, in a general sense, the links are never completely inactive. When Ethernet switch 58 receives the IDLE signals, it drops the IDLE signals such that no activity is triggered in the upper layers of this Ethernet switch 58. Additionally, if after a certain time interval there is still no data to be sent, then a low-power IDLE state can be entered in which a plurality of low-power IDLE signals 64 are sent at designated time intervals. This protocol can force an associated device into a low-power mode.

Thus, when both endpoint devices support EEE, a given system can configure the MAC to begin transmitting low-power IDLE signals in the place of regular IDLE signals during periods of inactivity (i.e., when there is no data to send). These IDLE signals represent the code words for the transmit logic in a respective PHY element to shift into a low-power mode. The PHY can then communicate to its link partner so that the remote link partner can also put its receive intelligence (e.g., its receiving logic) into a low-power mode.

When the system wants to transition to a normal mode of operation, the MAC can stop sending LPIs and, subsequently, start sending normal IDLEs. The duration for which the MAC sends normal IDLEs before it starts sending data can be determined by the PHY wake-up time, which was negotiated during auto-negotiation. This PHY wake-up time provides sufficient time (a wait time, or a delay) for the transmit logic on the local PHY and the receive logic on the remote PHY to transition from a low-power mode of operation to a normal mode of operation. In a general sense, the lower layers of computer element 56 can inform the upper layers that the remote link partner can support EEE. Then the upper layers of computing element 56 can send instructions to the lower layers to go to sleep when the upper layers do not have data to be sent.

FIG. 3 is a simplified table 70 illustrating terms for a low-power IDLE scenario. More specifically, FIG. 3 is representative of the behavior on a link as specified by IEEE 802.3az when the PHYs are EEE capable and have low power modes. In this sense, FIG. 3 is indicative of a generalized EEE capable system. In example embodiments of this disclosure, the PHY are EEE agnostic and, thus, the behavior on the line will not be QUIET or REFRESH.

A timing schematic 80 is also provided in FIG. 3 to illustrate the active and low-power states associated with two example computer elements. As shown in table 70, an example sleep time (Ts) can be representative of the duration for a PHY to send sleep symbols (e.g., signals, code words, etc.) over a link before shifting to a quiet mode of no activity. For the quiet duration (Tq), this represents the duration that a PHY remains quiet before it should wake for a refreshing period. For the refresh duration (Tr), this represents the duration a PHY sends refresh symbols for timing recovery and for coefficient synchronization. For the PHY wake time (Tw_PHY), this represents the duration that the PHY takes to resume to an active state after receiving the PHY wake time (Tw_PHY) decision to awaken. For the system wake time (Tw_System), this represents the wait period where no data is transmitted and, further, this gives the receiving system time to wake-up from its dormant state.

Figure 4B:
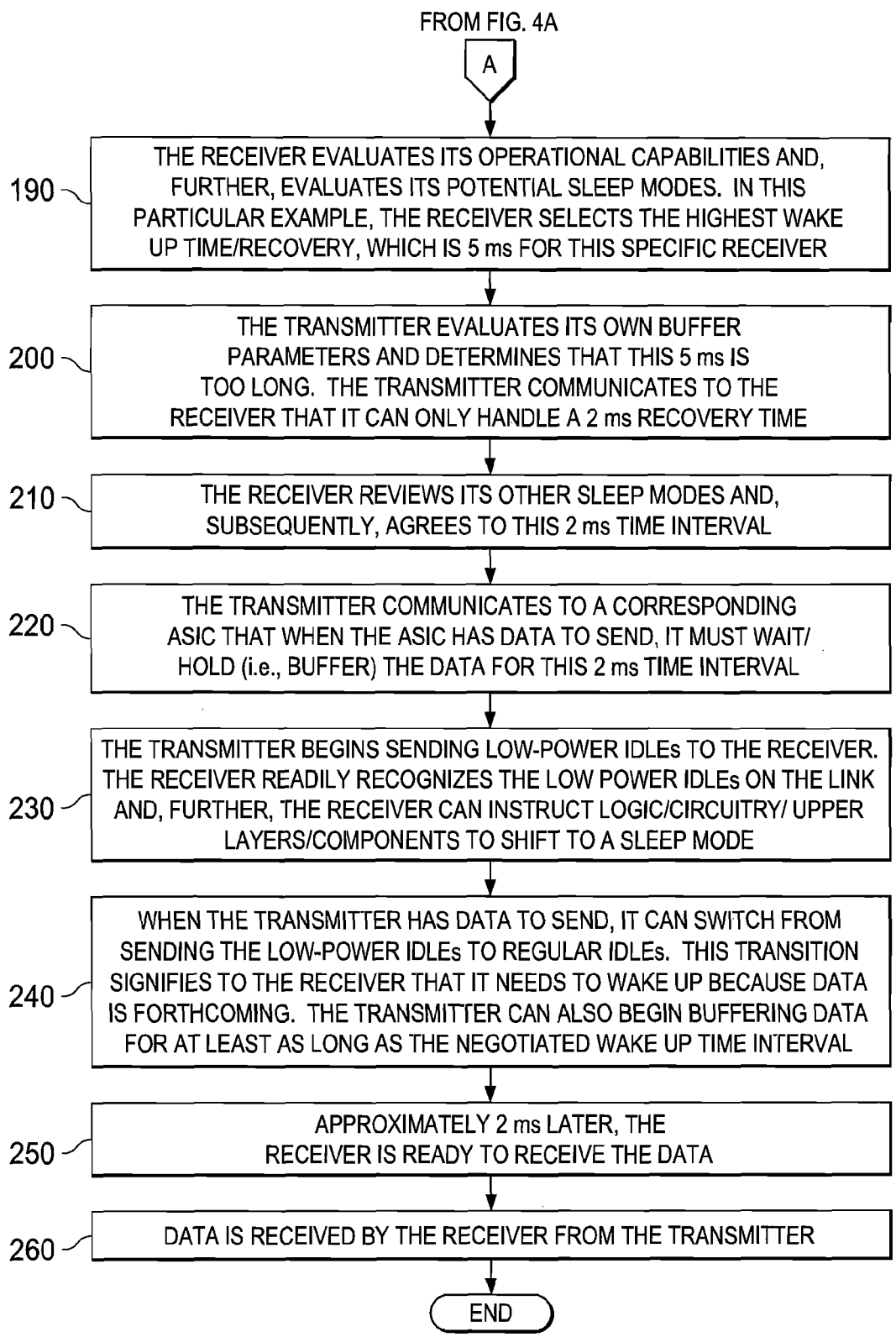

FIGS. 4A-B are simplified flowcharts illustrating an example flow 100, which is illustrative of activities associated with system 10. For purposes of simplification, details associated with flow 100 are described between a local transmitter and a remote receiver, which could readily be part of computer elements 12, 14 of system 10 in FIG. 1. In this particular example, both the transmitter and the receiver have powered up, where a local computer element and a remote computer element are operational. This is reflected by step 110. As data is ready for propagation, it may be exchanged between local and remote computer elements. More specifically, a PHY can be coupled to the transmitter (e.g., at a local endpoint) and another PHY can be similarly coupled to the receiver (e.g., at a remote endpoint). The PHY is configured to convert the data to code words and, further, to transmit the code words on the link that can connect the transmitter and the receiver. This is reflected by step 120. At step 130, the receiver can decode the code words it receives over the link.

In this particular example, the transmitter is configured to send IDLE signals (e.g., code words representing IDLEs), whenever it does not have data to send to its counterparty receiver. This is shown in step 140. At step 150, the receiver can receive these IDLE signals and simply drop them without further signal analysis. The receiver has intelligence to readily detect/identify IDLEs. In this particular example, the link layer is used to negotiate capabilities associated with a corresponding computing element. For example, negotiations may occur in order to determine how much power is needed (e.g., for operating a telephone, for operating a switch, for operating a router, for operating a personal computer, for operating a PDA, etc.). Additionally, negotiations may occur in order to exchange capabilities for data propagation on the link (e.g., necessary encryption, bandwidth parameters, latency tolerance, etc.).

Once the link layer communication is established between the two computing systems, the local and remote endpoints can determine whether each endpoint has LPI capabilities. This is reflected at step 160. More specifically, the transmitter can send a signal to the receiver in order to query the receiver if it is capable of supporting low-power IDLEs. Note that at this juncture, the PHY does not have this information because if the PHY did have this capability, it would have known about this information beforehand. In this particular example, and at step 170, the receiver responds that (in fact) it does have the LPI capability.

The transmitter then proceeds to negotiate wake-up times for its counterparty receiver, as shown at step 180. In a general sense, the transmitter is asking the receiver how much time the receiver needs to recover (i.e., wake-up recovery), after it has shifted from a sleep mode. At step 190, the receiver evaluates its operational capabilities and, further, evaluates its potential sleep modes. In this particular example, the receiver selects the highest wake-up time/recovery, which is 5 ms for this specific receiver. Note that any of the timing parameters offered in this particular example can certainly be varied to accommodate particular configurations or arrangements in other systems.

At step 200, the transmitter evaluates its own buffer parameters and determines that this 5 ms time parameter is too long. The transmitter then communicates to the receiver that it can only handle a 2 ms recovery time. At step 210, the receiver reviews its other sleep modes and, subsequently, agrees to this 2 ms time interval. At step 220, the transmitter communicates to a corresponding ASIC that when the ASIC has data to send, it must wait/hold (i.e., buffer) the data for this 2 ms time interval. Further negotiation in additional upper layers is not necessary at this juncture.

At step 230, the transmitter begins sending low-power IDLE signals to the receiver. The receiver readily recognizes the LPI signals on the link and, further, the receiver can instruct logic/circuitry/upper layers/components to shift to a sleep mode. For example, in a laptop computer or a personal computer, this could relate to computer elements shifting into a low-power mode (e.g., a sleep mode, a hibernation mode, etc.). When the transmitter has data to send at step 240, it can switch from sending the low-power IDLEs to sending regular IDLEs. This transition signifies to the receiver that it needs to wake-up because data is forthcoming. The transmitter can also begin buffering data for at least as long as the negotiated wake-up time interval. Approximately 2 ms later, the receiver is ready to receive the data at step 250. At step 260, data is received by the receiver from the transmitter, where a normal data exchange occurs.

Note that in certain example implementations, the power-consumption management functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.). In some of these instances, a memory element (as shown in FIG. 1) can store data used for the operations described herein. This includes the memory element being able to store software, logic, code, or processor instructions that can be executed to carry out the activities described in this Specification. A processor can execute any type of instructions associated with the data to achieve the operations detailed herein in this Specification. In one example, the processor (as shown in FIG. 1) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

In one example implementation, computer elements 12, 14 may include software in order to achieve the power-consumption management functions outlined herein. These activities can be facilitated by ASICs 22*a-b*. Computer elements 12, 14 can include memory elements for storing information to be used in achieving the intelligent power-consumption management, as outlined herein. Additionally, computer elements 12, 14 may include a processor that can execute software or an algorithm to perform the power-consumption management, as discussed in this Specification. These devices may further keep information in any suitable memory element (random access memory (RAM), ROM, EPROM, EEPROM, ASIC, etc.), software, hardware, or in any other suitable component, device, element, or object where appropriate and based on particular needs. Any possible memory items (e.g., database, table, cache, etc.) should be construed as being encompassed within the broad term 'memory element.' Similarly, any of the potential processing elements, modules, and machines described in this Specification should be construed as being encompassed within the broad term 'processor.'

Note that with the example provided above, as well as numerous other examples provided herein, interaction may be described in terms of two, three, or four computer elements. However, this has been done for purposes of clarity and example only. In certain cases, it may be easier to describe one or more of the functionalities of a given set of flows by only referencing a limited number of computer elements. It should be appreciated that system 10 (and its teachings) are readily scalable and can accommodate a large number of components, as well as more complicated/sophisticated arrangements and configurations. Accordingly, the examples provided should not limit the scope or inhibit the broad teachings of system 10 as potentially applied to a myriad of other architectures.

It is also important to note that the steps in the preceding flow diagrams illustrate only some of the possible signaling scenarios and patterns that may be executed by, or within, system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by system 10 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, the present disclosure is equally applicable to various green (i.e., power conserving, or power conscious) technologies. For example, next generation ASICs may include a green mode, where the ASIC can put their receive logic to sleep when a remote link transmitter does not have data to send. This includes the receive buffer, receive parser, MacSec decryption block etc. and, hence, these components and their associated operations have the potential for power savings. The associated ASICs can be used to control EEE compliant PHYs. It is envisioned that these ASICs can similarly be used to drive optical modules like SFP+, Q-SFP etc.

Example embodiments presented herein offer a mechanism to understand the EEE capabilities (e.g., above the MAC). This allows both ends of the link to enable LPI code words being sent across the link. Operationally, the MAC, reconciliation sublayer (RS), and the PHY would be continuously sending LPIs (e.g., even during sleep modes). System 10 can use the discussed Layer-2 discovery mechanism, or green protocols (e.g. such as those described in a commonly assigned patent application having Ser. No. 12/368,124 (entitled: System and Method for Intelligent Energy Management in a Network Environment), filed Feb. 9, 2009; and commonly assigned patent application having Ser. No. 12/368,154 (entitled: System and Method for Querying for Energy Data in a Network Environment) filed Feb. 25, 2009, which are both hereby incorporated by reference herein) in achieving the described operations.

Furthermore, these green protocols can probe the capability of the remote link partner regarding LPI. Both local and remote endpoints can enable/disable LPI code words on the link in such a way that the receiver is capable of handling the code words before the transmitter sends them. Additionally, in these green protocols, both local and remote endpoints can negotiate for system wake-up times, which may be similar to those defined in the EEE protocol. In certain example embodiments, additional power savings can be obtained from logic above the MAC elements. Moreover, although system 10 has been illustrated with reference to particular elements and operations that facilitate the communication process, these elements and operations may be replaced by any suitable architecture or process that achieves the intended functionality of system 10.

What is claimed is:

1. A method, comprising:
communicating a first signal to a remote computer element, wherein the first signal can be used to establish a link between the remote computer element and a local computer element;
evaluating, prior to sending any low-power IDLE signals to the remote computer element, whether the remote computer element is configured to support a low-power protocol in which low-power IDLE signals are exchanged between the local computer element and the remote computer element, wherein the evaluating is performed using a data link layer protocol;
causing an upper layer portion of the local computer element to shift to a low-power mode during a period in which low-power IDLE signals are exchanged between the local computer element and the remote computer element;
negotiating a wake-up time for the remote computer element to shift from the low-power mode to an active mode, wherein the negotiating is performed using the data link layer protocol; and
communicating the negotiated wake-up time to the upper layer portion.

2. The method of claim 1, further comprising:
evaluating buffer parameters in order to confirm the wake-up time for the remote computer element to shift to the active mode.

3. The method of claim 1, further comprising:
delaying a data transmission on the link for at least the wake-up time that was negotiated.

4. The method of claim 1, further comprising:
determining that new data should be communicated to the remote computer element; and
communicating a plurality of normal IDLE signals to the remote computer element before sending the new data.

5. The method of claim 1, wherein the link layer protocol is a data link layer discovery protocol (LLDP), and wherein the communicating further comprises transmitting the first signal to a receiver within the remote computer element.

6. The method of claim 1, wherein the low-power IDLE signals represent code words for the remote computer element to shift into the low-power mode, and wherein the link is a fiber-optic link.

7. The method of claim 1, further comprising:
communicating the low-power IDLE signals to the remote computer element.

8. Logic encoded in one or more non-transitory tangible media that includes code for execution and when executed by a processor operable to perform operations comprising:
communicating a first signal to a remote computer element, wherein the first signal can be used to establish a link between the remote computer element and a local computer element;
evaluating, prior to sending any low-power IDLE signals to the remote computer element, whether the remote computer element is configured to support a low-power protocol in which low-power IDLE signals are exchanged between the local computer element and the remote computer element, wherein the evaluating is performed using a data link layer protocol;
causing an upper layer portion of the local computer element to shift to a low-power mode during a period in which low-power IDLE signals are exchanged between the local computer element and the remote computer element;
negotiating a wake-up time for the remote computer element to shift from the low-power mode to an active mode, wherein the negotiating is performed using the data link layer protocol; and
communicating the negotiated wake-up time to the upper layer portion.

9. The logic of claim 8, wherein the operations further comprise:
evaluating buffer parameters in order to confirm the wake-up time for the remote computer element to shift to the active mode.

10. The logic of claim 8, wherein the operations further comprise:
delaying a data transmission on the link for at least the wake-up time that was negotiated.

11. The logic of claim 8, wherein the operations further comprise:
determining that new data should be communicated to the remote computer element; and
communicating a plurality of normal IDLE signals to the remote computer element before sending the new data.

12. The logic of claim 8, wherein the data link layer protocol is a link layer discovery protocol (LLDP), and wherein the communicating further comprises transmitting the first signal to a receiver within the remote computer element.

13. An apparatus, comprising:
a memory element configured to store data,
a processor operable to execute instructions associated with the data, and
an application specific integrated circuit that is resident in a local or element and that is configured to:
communicate a first signal to a remote computer element, wherein the first signal can be used to establish a link between the remote computer element and the local computer element;
evaluate, prior to sending any low-power idle signals to the remote computer element, whether the remote computer element is configured to support a low-power protocol in which low-power IDLE signals are exchanged between the local computer element and the remote computer element, wherein the evaluating is performed using a data link layer protocol;

cause an upper layer portion of the local computer element to shift to a low power mode during a period in which low-power IDLE signals are exchanged between the local computer element and the remote computer element;

negotiate a wake-up time for the remote computer element to shift from a low-power mode to an active mode, wherein the negotiating is performed using the data link layer protocol; and communicate the negotiated wake-up time to the upper layer portion.

14. The apparatus of claim 13, wherein the application specific integrated circuit is further configured to:

evaluate buffer parameters in order to confirm the wake-up time for the remote computer element to shift to the active mode.

15. The apparatus of claim 13, wherein the application specific integrated circuit is further configured to:

delay a data transmission on the link for at least the wake-up time that was negotiated.

16. The apparatus of claim 13, wherein the application specific integrated circuit is further configured to:

determine that new data should be communicated to the remote computer element; and communicate a plurality of normal IDLE signals to the remote computer element before sending the new data.

17. The apparatus of claim 13, further comprising:

a transmitter configured to transmit the first signal to a receiver within the remote computer element, wherein the data link layer protocol is a link layer discovery protocol (LLDP).

18. The apparatus of claim 13, wherein the transmitter is further configured to communicate the low-power IDLE signals to the remote computer element.

19. The apparatus of claim 13, wherein the low-power IDLE signals represent code words for the remote computer element to shift into the low-power mode, and wherein the link is a fiber-optic link.

\* \* \* \* \*